United States Patent [19]

Shimada et al.

[11] Patent Number: 4,496,637
[45] Date of Patent: Jan. 29, 1985

[54] ELECTRODE FOR FLOWCELL

[75] Inventors: Masayoshi Shimada; Yasuhiro Iizuka; Tetuo Hukazu, all of Otsu, Japan

[73] Assignee: Toyo Boseki Kabushiki Kaisha, Osaka, Japan

[21] Appl. No.: 564,544

[22] Filed: Dec. 22, 1983

[30] Foreign Application Priority Data

Dec. 27, 1982 [JP] Japan .................. 57/229994

[51] Int. Cl.³ .................. H01M 4/96
[52] U.S. Cl. .................. 429/44; 429/107; 429/109; 423/447.2
[58] Field of Search .................. 423/445, 447.1, 447.2, 423/448, 447.6; 429/44, 42, 107, 109; 204/294; 252/502

[56] References Cited

U.S. PATENT DOCUMENTS

| | | | |
|---|---|---|---|
| 3,702,054 | 11/1972 | Araki et al. | 423/447.1 |
| 3,985,578 | 10/1976 | Witherspoon et al. | 429/44 |
| 3,991,169 | 11/1976 | Makita et al. | 429/44 X |
| 4,293,396 | 10/1981 | Allen et al. | 429/44 X |
| 4,328,287 | 5/1982 | Sammells et al. | 429/44 X |
| 4,360,417 | 11/1982 | Reger et al. | 429/44 X |
| 4,370,392 | 1/1983 | Savinell et al. | 429/109 X |
| 4,382,116 | 5/1983 | Gahn et al. | 429/107 X |

Primary Examiner—Anthony Skapars
Attorney, Agent, or Firm—Jones, Tullar & Cooper

[57] ABSTRACT

An electrode for an flowcell comprising electrode material made of carbon fiber having average <002> spacing of quasi-graphite crystalline structure of not more than 3.70 Å, and the average C-axis size of crystallite of not less than 9.0 Å and at least 3% by mole of oxygen atom bound to the fiber surface based on carbon atom, whereby the electrode has remarkable high electrical conductivity, current efficiency handling characteristics and hydrodynamic characteristics, and is adapted to flowcell.

8 Claims, 4 Drawing Figures

1

ELECTRODE FOR FLOWCELL

TECHNICAL FIELD

The present invention relates to a novel electrode. More particularly, it relates to an electrode for a flowcell which comprises fabric made from a carbon filter having a specific crystalline structure and specified amount of oxygen bound to the surface of the carbon fiber.

PRIOR ART

After the energy crisis in 1973, the importance of the energy problem has been recognized among the people of all social standings. It has risen in importance to develop effective systems involving conversion, storage, transportation and utilization of generated energy as well as to develop new energy sources.

Taking storage as an example, it is required for a large-sized power station, such as a nuclear power station, thermal power station or the like, which will be relatively important in the future as a power source, to operate at constant output so as to maintain high efficiency. Therefore, it rises in importance to develop energy storage techniques for power utility load leveling, which attempts to store surplus power during the night when effective and then release stored power in the daytime, following the energy demand. At this time, main electric power plants only have less than 60% of operating efficiency in a year, which further continues to decrease.

As a method for storage of electric energy, pumped-storage power station is in practical use, however, it experiences energy losses on transportation, and further the location of said power station is recently limited. Examples of other methods for storage of electric energy under development stages are new secondary battery, flywheel, compressed air, superconduction and so forth.

An electrochemical operation by new secondary battery is particularly potent and believed that it will be in practical application for sometime as the system including transportation instead of pumped-storage power station. The secondary battery is also expected as the backup equipment for electricity generation by natural energy, such as sunlight, wind force, wave force and the like, and as a battery for an electric vehicle. Examples of developed secondary batteries for the above application are lead battery, sodium-sulfur battery, lithium-iron sulfide battery, metal-halogen battery, redox flow type battery and the like. Among these new secondary batteries, the metal-halogen secondary battery and the redox flow type secondary battery belong to regenerative fuel cell, in which battery active material provided from the outside stores and releases electrochemical energy. The redox flow type secondary battery is the typical regenerative type fuel cell. The most developed redox flow type secondary battery comprises $Cr^{2+}$ (liquid) as an active material for the negative pole, $Fe^{3+}$ (liquid) as an active material for the positive pole and aqueous HCl solution as the electrolyte. Charge-discharge reactions are as follows:

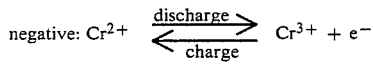

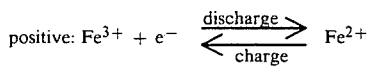

These electrochemical reaction in the electrolytic cell are generally heterogeneous reaction on the electrode, and hence, the electrolytic cell is essentially two-dimensional, whereby the electrolytic cell has a drawback that the amount of reaction per unit volume of electrolytic cell is small. In order to overcome the above drawback, the electrochemical reaction field has been changed to three-dimensional to increase the amount of reaction per volume, that is, current density. Three-dimensional electrode is applied to said regenerative type fuel cell, to sewage treatment, and to production of organic compound by electrolysis. In general, electrochemical reaction in a regenerative type fuel cell is most preferably carried out in a flowcell having a single-pole type three-dimensional electrode as shown in accompanied FIGS. 1(a), (b) and (c). In FIGS. 1(a), (b) and (c), 1 refers to separator, 2 refers to a passage for electrolyte, 3 refers to a current collector and 4 refers to a three-dimensional electrode. The flowcells shown in FIGS. 1(b) and (c) provide a preferable structure as a secondary battery which makes up a large battery by connecting of single-cells electrically in series.

In conventional three-dimensional electrode for regenerative type fuel cells, conventional non-woven fabric and woven fabric of carbon fiber and porous plate of carbon have been employed in view of their good electrical conductivity, chemical resistance, economy and the like.

The porous plate of carbon is difficult to employ, because of the fact that the strength of carbon plate decreases to become breakable during the fabrication stage, and processing into thin plate with accuracy, for example 1 mm thickness, is difficult when porosity of porous plate increases to obtain large reaction surface.

On the other hand, although non-woven fabric made of conventional carbon fiber has an advantage that it has a large reaction field because of the independent presence of entangled single fiber, it is also difficult to employ because engagement among fibers is accomplished at points to give a small amount of contact area. It also has drawbacks in that the electric resistance in assembly of non-woven fabric increases so that the internal resistance of the battery can not decrease. Non-woven fabric has also a drawback in that it has low density of fiber. Moreover, non-woven fabric has a drawback that it is readily cut and powdered to fall off when subjected to only slight tension and tear during treatment or processing.

Furthermore, woven fabric made from conventional carbon fiber can not improve the characteristics of the electrode, that is, cell electrical conductivity (voltaic efficiency) and current efficiency. And hydrodynamic pressure drop through woven fabric is higher than that through non-woven fabric or knitted fabric which is mentioned below.

As a result by intensive study of the present inventors with respect to a three-dimension electrode to solve the above drawbacks of a conventional electrode, it has been found that the specific carbon single fiber serves as an excellent electrode material, that is, when carbon single fiber constituting electrode material has suitable internal structure, especially crystalline structure, and a suitable amount of oxygen is bound to the fiber surface, there can be obtained an excellent electrode for a flow-cell. It has been also found that the knitted fabric made of said specific carbon fiber particularly gives an excellent electrode material.

As to a redox flow type secondary battery having the electrode made of conventional carbon fiber (typically, iron-chromium redox flow type secondary battery by charge-discharge reaction, as mentioned hereinbefore), there have been problems in that the oxidation-reduction reaction of chromium ion (Chromous, Chromic) is slow, that is, the battery has low cell conductivity, and the current efficiency of the battery is apt to decrease by the generation of hydrogen on the negative-pole during charge.

SUMMARY OF THE INVENTION

An object of the present invention is to provide an improved three-dimensional electrode having excellent electrical conductivity, current efficiency, handling characteristics and hydrodynamic characteristics. Another object of the present invention is to provide an improved electrode for a flowcell, especially for a regenerative fuel cell. These and other objects and advantages of the present invention will be apparent to those skilled in the art from the following detailed description.

DETAILED DESCRIPTION

Figure 1A:
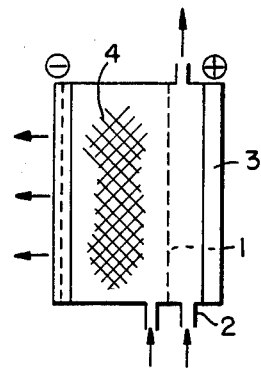
Figure 1B:
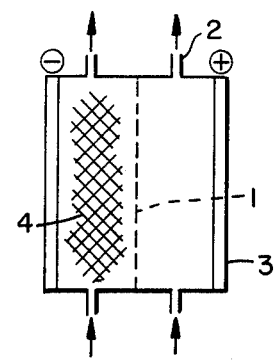
Figure 1C:
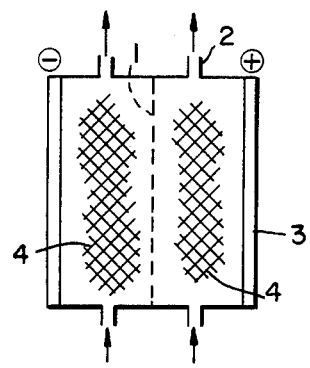

These objects are accomplished by obtaining electrode material made of carbon fiber having an average <002> spacing of quasi-graphite crystalline structure of not more than 3.70 Å, and the average C-axis size of crystallite of not less than 9.0 Å and at least 3% by mole of oxygen atom bound to the fiber surface based on the carbon atom. The cloth which produces the electrode material made of carbon fiber in this invention includes knitted fabric and woven fabric, preferably knitted fabric. The woven fabric employed in this invention includes any conventional weave.

The objects of this invention are particularly accomplished by employing the knitted fabric made of carbon fiber having said characteristics.

The knitted fabric, which produces the electrode of the present invention, has a density of not less than 0.1 g/cc which is considerably higher than those of non-woven fabric and compares to those of woven fabric, however, the knitted fabric is characterized by structure. Preferably, the knitted fabric has the structure which comprises a large quantity of fiber running in the direction of thickness of cloth. The electrode material consisting of carbon fiber cloth having such structure can provide an excellent reaction field when electrolyte is passed through the structure. There is provided another advantage in processing a fabric different from woven fabric, that is, yarn of knitted fabric which is not frayed by cutting in fabrication of the electrode.

Suitable examples of the structure of weft knitted fabric employed in this invention are foundation structure, such as plain stitch, rib stitch and pearl stitch, application structure, such as tuck stitch, float stitch, interlock stitch, three step tuck stitch, four step tuck stitch, and the like, derivative structure, such as TEREKO stitch, eyelet stitch, plush stitch, jacquard stitch and the like and double knitted weave having plain structure, such as mock rodier, ponti de Roma, single pique, milano rib, honey comb, eight lock, and the like.

Suitable examples of the structure of warp knitted fabric employed in this invention are single knitting structure, such as two neelde stitch and English leather stitch having thickness and high density, and double knitting structure, such as double denbigh stitch, double half stitch, back half stitch and the like.

The cloth or fabric employed in this invention is required to prevent creases and cracks which occur during fabrication of the electrode, and use thereof and to maintain uniform surface. In view of the above, the preferred fabric has observed density of not more than 0.35 g/cm$^3$ and longitudinal and transvere tensile elongation at breakage of not less than 5%.

Preferred raw material fiber employed for the electrode material in the present invention is a fiber which is carbonizable and has properties, such as strength, tensile elongation and the like, required for fabrication of fabric or knitted fabric and woven fabric, and has the ability to provide internal crystalline structure and density of oxygen bound to the fiber surface hereinafter.

Suitable examples of the raw material fiber are cellulosic fiber (e.g. regenerated cellulose fiber), acrylic fiber (e.g. polyacrylonitrile fiber), phenolic fiber (e.g. phenol novolak fiber), aromatic polyamide fiber (e.g. nylon), pitch fiber, polyethylene fiber and the like. Fineness of single fiber constituting a yarn is preferably 0.5 to 15 denier, since fine single fiber has advantages in outer surface area and strength.

These single fibers are bundled to give yarn, preferably spun yarn and multi-filament yarn. Size of the yarn is preferably not more than 1100 denier. When fineness of yarn is more than 1100 denier, it is difficult for electrolyte to diffuse into the bundle of single fibers.

The knitted fabric having said structure or woven fabric is made of the yarn, and subjected to flameproofing below 400° C. in an inert atmosphere or active atmosphere, if desired, after treatment with a suitable flameproofing agent. Then, the resulting fabric is subjected to carbonization over 500° C., preferably over 1100° C., to give the cloth of carbon fiber having the desired internal crystalline structure.

The resultant carbon fabric having said internal crystalline structure is subjected to a dry oxidation treatment to give a carbon fabric having the ability to raise the density of oxygen atoms bound to the fiber surface. For example, the oxidation is carried out in an oxygen partial pressure of over $1 \times 10^{-2}$ torr so as to obtain the yield of 65 to 99% by weight. A preferred treatment temperature is generally over 400° C. At a lower temperature (e.g. 200° C. to 300° C.), there can not be obtained the desired oxidation effect because of the lowered activity of the carbon fabric to be treated, while wet oxidation involves an undesirable problem, such as generation of inter layer compound and injurious gas during treatment and the like.

As described above, the dry oxidation can expose more edges of vertical surface to C-axis of quasi-graphite crystalline structure on the surface of the fiber and can bind oxygen atoms, which are effective in electrochemical reaction, to said edges. The oxygen atoms can be introduced in the form of carboxyl, phenolic hydroxy, carbonyl, quinone, lactone, free-radical type oxide and the like, which groups contribute much to electrode reaction so that electrical conductivity or voltage efficiency can be raised. Therefore, there is obtained a remarkably improved characteristic value of the battery, that is, current efficiency and electrical conductivity, by the employment of the electrode which comprises fabric made of carbon fiber having average <002> spacing of quasi-graphite crystalline structure of not more than 3.70 Å, and average C-axis size of crystallite of not less than 9.0 Å and at least 3% by mole of oxygen atom bound to the fiber surface based on the carbon atom. There has been accomplished the control of hydrogen generation on the negative pole during charging and the improvement of the current efficiency by the employment of the electrode which comprises fabric of carbon fiber having average <002> spacing of quasi-graphite crystalline structure of not more than 3.70 Å and average C-axis size of crystallite of not less than 9.0 Å. When carbon fabric has low crystallinity, that is, when <002> spacing is over 3.70 Å and average C-axis size of crystallite is less than 9.0 Å, the amount of generated hydrogen on the negative pole increases so that current efficiency can not be improved. It is not clear why current efficiency can increase by employment of electrode material made of carbon cloth having a high crystallinity and specific crystal structure, but it is assumed that overvoltage of hydrogen will increase by forming of a crystal structure, and then current efficiency will increase by the selective reduction of chromic complex ion during charging.

The electrode reaction rate or electrical conductivity can increase by employing carbon fabric having more than 3% by mole, preferably more than 7% by mole, of oxygen atom bound to the surface of the fiber base on the carbon atom (hereinafter, expressed as O/C ratio), as electrode material. When the carbon fabric employed in the electrode has less than 3% by mole of O/C ratio measured by ESCA analysis, electrode reaction rate during discharge is low and electrical conductivity can not be increased. It is not clear why electrical conductivity or voltage efficiency can increase by employing electrode material made of carbon fiber cloth having high O/C ratio, but it is assumed that the oxygen atoms bound to the surface effectively act on the transfer of electrons, disconnecting of complex ion from the carbon fiber, complex exchange reaction and the like. The present invention is illustrated by the following Examples, but is not limited thereto.

In the Examples, various properties were measured in the following manner.

(1) <002> Spacing ($d_{002}$): cloth made of carbon fiber was powdered in agate mortar to be incorporated with about 15% by weight of a high grade silicon powder for X-ray standard base on powdered sample as internal standard material, then the sample was placed in a test cell. A high angle X-ray diffraction curve was obtained by transmission type diffractometry with CuKα-ray.

Correction of the resulting curve was accomplished by the following easy method, without using of Lotrnz-Lorenz's formula, polarization factor, absorption factor, atomic scattering factor and the like. A baseline was drawn on the base of a peak corresponding to <002> diffraction, and substantial intensity based on baseline was plotted again to give a <002> correction intensity curve. There was obtained the middle point of segment cut away with intensity curve from the line parallel to the angle axis at a height of two-thirds of the peak of the curve, and then the angle at the middle point was corrected with internal standard, which corresponds to twice the angle of diffraction, whereby <002> spacing was obtained with wavelength λ of CuKα by following Bragg formula:

$$d_{002} = \lambda / 2 \sin \theta \qquad (1)$$

λ: 1.5418 Å
θ: angle of diffraction (2) Average C-axis size of crystallite (Lc): it was obtained by the following formula with half-width β, which is the width of the peak at the half height of the peak in the corrected diffraction intensity curve described in (1) above.

$$Lc = (K \cdot \lambda / \beta \cos \theta) \qquad (2)$$

wherein the factor K is 0.90, and λ and θ are defined in (1).

Figure 2:
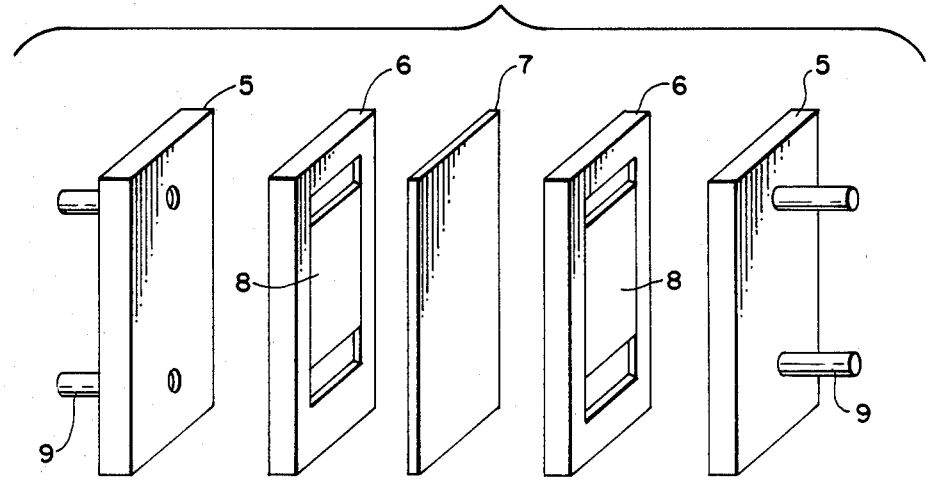

(3) Cell current efficiency: the electrode ability was measured by repeating the charge-discharge at various levels of constant current density in a small size flowcell shown in FIG. 2, FIG. 2 being a diagramatic illustration of a flowcell for measurement of current efficiency. In FIGS. 2, 5, 6, 7, 8 and 9 refer to a graphite plate collector, a spacer, an ion exchange membrane, a carbon fiber fabric and a passage for active material aqueous solution, respectively. 4N hydrochloric aqueous solution of 1 M/l chromic chloride was employed. The solution for the positive pole was taken in considerable excess of that for the negative pole so that the characteristics of the negative pole could be mainly studied. The surface area of the electrode was 10 cm² and the flow rate of the solution was about 5 ml/minute. The values of current density employed in the Examples were 20, 40, 60, 80 and 100 mA/cm² provided that current density of charge is same as that of discharge. Current efficiency was obtained by the following formula.

$$\text{current efficiency (\%)} = \frac{Q_2 + Q_3}{Q_1} \times 100 \qquad (3)$$

wherein $Q_1$ (Coulomb: C) is a quantity of electricity required during charge and $Q_2$ (C) and $Q_3$ (C) are respectively the quantity of electricity which is utilized during discharge at constant current until 0.2 V and during sequent discharge at constant voltage until 0.8 V, in 1 cycle test of charge and discharge. When side reaction during charge is carried out, that is, reaction except the reduction of $Cr^{3+}$ to $Cr^{2+}$ (e.g. reduction of $H^+$) is carried out, the utilizable quantity of electricity decreases and then current efficiency decreases. The test was carried out at about 25° C. (4) Cell electrical conductivity: depth of charge was obtained by the following formula with the flowcell described in (3) above.

$$\text{depth of charge (\%)} = \frac{Q_2}{Q_{th}} \times 100 \qquad (4)$$

wherein $Q_{th}$ (C) is the theoretical quantity of electricity required for complete reduction of $Cr^{3+}$ to $Cr^{2+}$ in negative electrolyte, and $Q_2$ (C) is the quantity of electricity which is utilized during discharge. Cell resistivity ($\Omega$ cm²) and its inverse number or cell electrical conductivity (S cm$^{-2}$) was obtained from the slope of the current-voltage curve at 50% of depth of charge. As cell electrical conductivity increases, the ion oxidation-reduction reaction on the electrode becomes faster, and hence, the discharge voltage at high current density and voltage efficiency are high whereby a excellent electrode can be obtained. The test was carried out at about 25° C.

(5) O/C ratio: it was measured by X-ray photoelectric spectrometry (ESCA or XPS) with a spectrometer (Type ESCA 750, made by Shimazu Limited) at MgKα ray (1253.6 eV) in degree of internal vacuum of $10^{-7}$ torr.

Each test fabric was punched to obtain a test sample (diameter: 6 mm), which was attached to a specimen carrier by double-coated tape to be measured.

The measurement was carried out about peaks Cls and Ols, which were analyzed with ESCAPAC 760 (made by Shimazu Limited) following the correction procedure of J. H. Scofield to give a peak area. The resultant peak area value was multiplied by relative intensity, that is, 1.00 for Cls and 2.85 for Ols, from which the ratio of the count of atoms on the surface (O/C ratio: %) was directly calculated.

EXAMPLE 1

Two ply yarn (yarn number count: 20) made of regenerated cellulose fiber (fineness of single fiber: 2.0 denier) was knitted with an interlock circular knitting machine (14 gage) to obtain interlock fabric. The resulting knitted fabric had a METSUKE (weight) of 424 g/m$^2$ observed density of cloth of 0.370 g/cm$^3$ and thickness of 1.15 mm. After scouring, the knitted fabric was dipped into an aqueous diammonium hydrogenphosphate, squeezed and dried to give cloth which contains 10% of diammonium hydrogenphosphate based on the weight of dry cloth. The resulting fabric was subjected to flameproofing by heating at 270° C. for 60 minutes in inert gas flow, and then subjected to carbonization by heating 1600° C. at the rate of 400° C./hour and maintaining of the temperature for 30 minutes. After cooling, there was obtained the knitted fabric made of carbon fiber, which had METSUKE (weight) of 270 g/m$^2$ and density of 0.26 cc/g.

Then, the resulting knitted fabric was subjected to oxidation at a temperature of 900° C. in an inert gas having an oxygen partial pressure of 200 torr to obtain electrode material from which the electrode for a three-dimensional type flowcell was made up. The knitted fabric of carbon fiber had $d_{002}$ of 3.60 Å and Lc of 9.8 Å as a result of X-ray analysis, and an O/C ratio of 10.2% by mole. The fabric was cut to obtain two sheets of cloth (1 cm×10 cm), and fixed between the frame of each two spacers shown in FIG. 2 to make an electrode. The electrode thus obtained had an electrical conductivity of 0.42 Scm$^{-2}$ and a current efficiency of 93.8% following the electrode test procedure of. The sample without oxidation had an O/C ratio of 6.3% and $d_{002}$ of 3.60 Å, and had cell conductivity of 0.18 Scm$^{-2}$.

EXAMPLE 2

Spun yarn (yarn number count: 10, twisted form three yarns) made of regenerated cellulose fiber (fineness of single fiber: 2.0 denier) was woven to obtain woven fabric to tussah weave having warp density of 45 yarn/inch and weft density of 29 yarn/inch, METSUKE (weight) of 544 g/m$^2$ and thickness of 1.4 mm. the resulting woven fabric was subjected to flameproofing, carbonization and an oxidation treatment in the same manner as described in Example 1 to obtain woven fabric made of carbon fiber, which had METSUKE (weight) of 372 g/m$^2$ and thickness of 1.2 mm. The woven fabric thus obtained had $d_{002}$ of 3.65 Å and Lc of 9.6 Å as a result of X-ray analysis, and an O/C ratio of 9.5% by mole. The fabric was processed in the same manner as described in Example 1 to make an electrode. The electrode thus obtained had an electrical conductivity of 0.27 Scm$^{-2}$. The hydrodynamic pressure drop through the cell is 340 mmHg, whereas in the case of Example 1 the drop was 120 mmHg.

EXAMPLE 3

Knitted fabric made in Example 1 was dipped into aqueous diammonium hydrogenphosphate. After flameproofing at 270° C., the resulting fabric was heated to 850° C. at a rate of 400° C./hour in an inert gas and maintained for 30 minutes. After cooling and oxidation, there was obtained the woven fabric made of carbon fiber. The fabric had $d_{002}$ of 3.88 Å, Lc of 8.1 Å and an O/C ratio of 10.5% by mole.

The fabric was processed in the same manner as described in Example 1 to make an electrode. The electrode thus obtained had an electrical conductivity of 0.20 Scm$^{-2}$ and current efficiency of 73.2% at current density of 40 mA/cm$^2$ during charge and discharge.

What is claimed is:

1. An electrode for a flowcell which comprises an electrode material made of carbon fiber having <002> spacing of quasi-graphite crystalline structure of not more than 3.70 Å, and an average C-axis size of crystallite of not less than 9.0 Å and at least 3% by mole of oxygen atom bound to the fiber surface based on carbon atom.

2. The electrode according to claim 1, wherein the carbon fiber constitutes a knitted fabric.

3. The electrode according to claim 2, wherein the knitted fabric has an observed density of less than 0.35 g/cm$^3$ and longitudinal and vertical elongation at break of not less than 5%.

4. The electrode according to claim 1, which is applied to a redox flow type secondary battery.

5. The electrode according to claim 1, wherein the active material for the positive pole of the electrode produces $Fe^{3+}$.

6. The electrode according to claim 1, wherein the active material for the negative pole of the electrode produces $Cr^{2+}$.

7. An electrode for a flowcell which comprises an electrode material made of carbon fiber having <002> spacing of quasi-graphite crystalline structure of not more than 3.70 Å, and an average C-axis size of crystallite of not less than 9.0 Å and at least 7% by mole of oxygen atom bound to the fiber surface based on carbon atom.

8. The electrode according to claim 7, wherein the carbon fiber constitutes a knitted fabric.

* * * * *